US008745601B1

(12) United States Patent
Carlson et al.

(10) Patent No.: US 8,745,601 B1
(45) Date of Patent: Jun. 3, 2014

(54) METHODS AND SYSTEMS FOR USING DATA STRUCTURES FOR OPERATING SYSTEMS

(75) Inventors: Eric O. Carlson, Mountain View, CA (US); Joshua H. Shaffer, San Jose, CA (US); James Mensch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1251 days.

(21) Appl. No.: 12/175,435

(22) Filed: Jul. 17, 2008

(51) Int. Cl.
*G06F 9/44* (2006.01)
(52) U.S. Cl.
USPC .............................. 717/138; 717/134; 717/174
(58) Field of Classification Search
None
See application file for complete search history.

(56) References Cited

U.S. PATENT DOCUMENTS

| | | | | |
|---|---|---|---|---|
| 5,950,010 A * | 9/1999 | Hesse et al. | | 717/178 |
| 5,978,584 A * | 11/1999 | Nishibata et al. | | 717/134 |
| 6,002,870 A * | 12/1999 | Faulkner et al. | | 717/134 |
| 6,028,999 A * | 2/2000 | Pazel | | 717/134 |
| 6,031,992 A * | 2/2000 | Cmelik et al. | | 717/138 |
| 6,049,664 A * | 4/2000 | Dale et al. | | 717/174 |
| 6,049,667 A * | 4/2000 | Bates | | 717/138 |
| 6,064,815 A * | 5/2000 | Hohensee et al. | | 717/138 |
| 6,272,674 B1 * | 8/2001 | Holiday, Jr. | | 717/174 |
| 6,279,156 B1 * | 8/2001 | Amberg et al. | | 717/174 |
| 7,162,628 B2 * | 1/2007 | Gentil et al. | | 713/100 |
| 7,441,113 B2 * | 10/2008 | Chong et al. | | 713/2 |
| 2002/0174215 A1 * | 11/2002 | Schaefer | | 709/224 |
| 2004/0139309 A1 * | 7/2004 | Gentil et al. | | 713/1 |
| 2006/0010433 A1 * | 1/2006 | Neil | | 717/138 |
| 2006/0048136 A1 | 3/2006 | Vries et al. | | |
| 2006/0161419 A1 * | 7/2006 | Herrell et al. | | 703/26 |
| 2007/0011672 A1 | 1/2007 | Bhide et al. | | |
| 2007/0043860 A1 * | 2/2007 | Pabari | | 709/224 |
| 2007/0083655 A1 * | 4/2007 | Pedersen | | 709/226 |
| 2007/0106993 A1 * | 5/2007 | Largman et al. | | 718/104 |
| 2007/0162901 A1 * | 7/2007 | Oh | | 717/148 |
| 2007/0168478 A1 * | 7/2007 | Crosbie | | 709/221 |
| 2007/0174429 A1 * | 7/2007 | Mazzaferri et al. | | 709/218 |
| 2007/0240149 A1 | 10/2007 | Cromer et al. | | |
| 2007/0240155 A1 * | 10/2007 | Shlomai | | 717/174 |
| 2007/0253436 A1 * | 11/2007 | Henry et al. | | 370/401 |
| 2008/0263306 A1 * | 10/2008 | Tanizawa | | 711/170 |
| 2008/0301676 A1 * | 12/2008 | Alpern et al. | | 718/1 |

OTHER PUBLICATIONS

"Wine User Guide," WineHq Mar. 13, 2007 <http://web.archive.org/web/20070101053732/http://winehq.org/docs/en/wineusr-guide.pdf> pp. 1-33.*
"Winelib User's Guide," WineHq Mar. 13, 2007 <http://web.archive.org/web/20061009065347/http://www.winehq.org/docs/en/winelib-guide.pdf> pp. 1-25.*
"What is Virtualization?", Red Hat, 2006, <http://www.redhat.com/f/pdf/virtualization/gunner_virtual_paper2.pdf>, pp. 1-3.*

(Continued)

*Primary Examiner* — Thuy Dao
*Assistant Examiner* — Samuel Hayim
(74) *Attorney, Agent, or Firm* — Womble Carlyle Sandridge & Rice LLP

(57) ABSTRACT

Methods and systems for creating and using data structures for operating systems. In one embodiment, a method includes receiving information indicating that a first installer is being launched for a first application program and storing, in response to the receiving of the information, first data which specifies changes to an operating system (OS) data structure that is used to configure a system to allow execution of the first application program after installing the first application program, the first data being stored separately from the OS data structure. The OS data structure may be, in one embodiment, a registry for configuring a system to execute multiple applications on the system.

25 Claims, 11 Drawing Sheets

(56) References Cited

OTHER PUBLICATIONS

Gubjan Khanna et al., "Application Performance Management in Virtualized Server Environments", IEEE, 2006, <http://ieeexplore.ieee.org/stamp/stamp.jsp?tp=&arnumber=1687567>, pp. 1-9.*

Pradeep Padala et al., "Adaptive Control of Virtualized Resources in Utility Computing Environments", ACM, 2007, <http://delivery.acm.org/10.1145/1280000/1273026/p289-padala.pdf>, pp. 1-14.*

Wine HQ. www.winehq.org, web pages (Nov. 9, 2007), 23 pages.

* cited by examiner

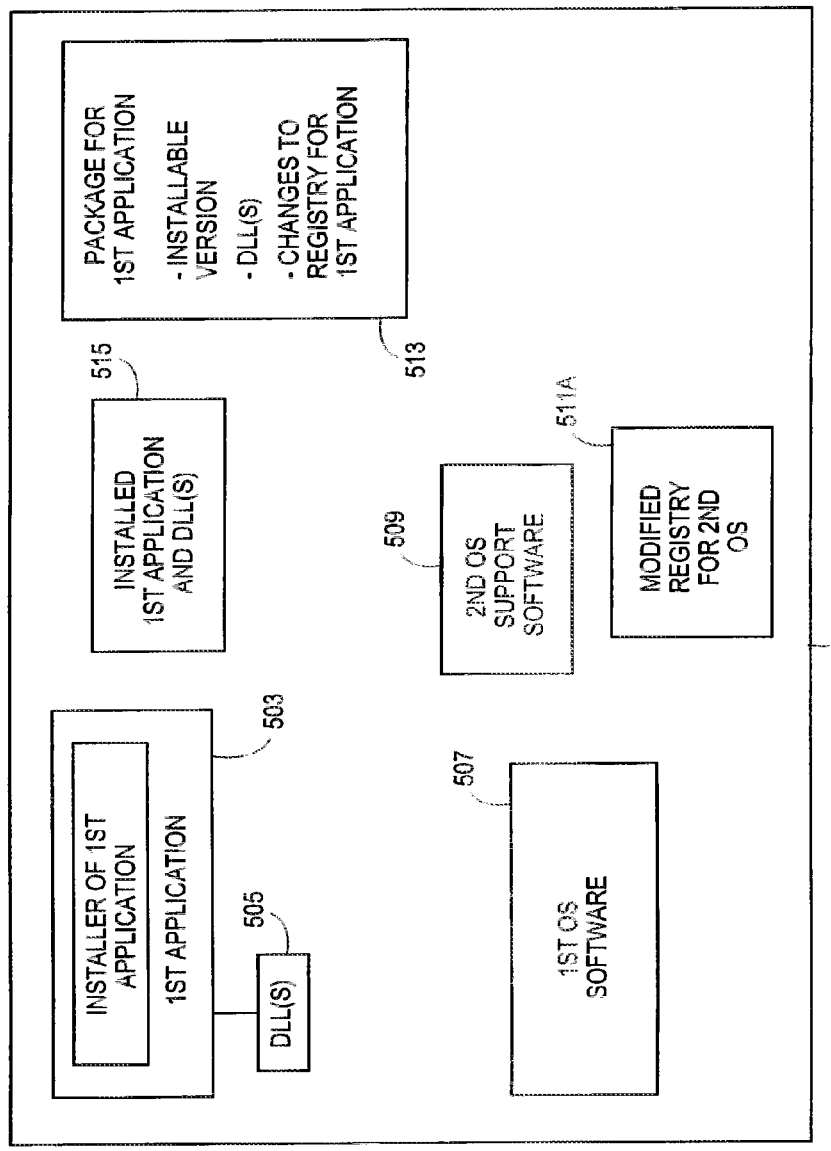

METHODS AND SYSTEMS FOR USING DATA STRUCTURES FOR OPERATING SYSTEMS

BACKGROUND

At least certain embodiments of the invention relate to data structures created and/or maintained by an operating system for application programs such as user application programs.

Certain operating systems maintain data structures for use by application programs such as word processing programs, email programs, spreadsheet programs, web browser programs, graphics creation programs, database programs, personal information (e.g. calendar and/or contacts) management programs, PDF viewer programs, etc. These data structures may include one or more files in one or more subdirectories of a file system or may include one or more databases used by the application programs or an operating system. For example, the Windows Operating System (OS) from Microsoft Corporation of Redmond, Wash., such as the Windows XP OS, maintains a registry which is a database of program registration entries and/or configuration data managed in kernel memory space by the Windows OS kernel. The Windows registry is a well known feature of the Windows OS. The configuration data in the Windows registry is used by the application programs and/or the Windows OS when the application program is run on the Windows OS or when the application program, written for the Windows OS, is run on another OS (e.g. a Unix OS) with or without a copy of the Window OS. Further examples of such data structures include the input/output registry for drivers maintained by Macintosh OS 9 software and the launch services database in Macintosh OS 10.4 or 10.5, which database is used to bind files to an application.

Application programs written or designed to run on the Windows OS can also be run on other operating systems such as a Unix OS or the Macintosh OS. Software known as Parallels and VMWare allow such application programs to run on the Macintosh OS; in the case of both Parallels and VMWare, such application programs run on a copy of the Windows OS which in turn is run on the Macintosh OS. In this case both the Windows OS and the Macintosh OS are executing along with such application programs. The Windows registry in this case is maintained by the Windows OS in the conventional fashion. Such application programs can also be run on a non-Windows OS (e.g. Unix OS or Macintosh OS) without a copy of a Windows OS. For example, Wine (see www.winehq.org) creates an environment to execute applications written for the Windows OS without needing a copy of the Windows OS; in other words, the Windows OS software need not be executing and need not be present on the system running Wine. Wine maintains a Windows registry for use by such application programs in the conventional manner. Further information about Wine can be found at the website: www.winehq.org.

SUMMARY OF THE DESCRIPTION

Exemplary embodiments of methods and systems for creating and using data structures for operating systems are described. In one embodiment, a method, which is machine implemented, includes receiving information that a first installer is being launched for a first application program, and storing, in response to the receiving of the information, first data which specifies changes to an operating system (OS) data structure that is used to configure a system to allow execution of the first application program after installing the first application program, wherein the first data is stored, in one embodiment, separately from the OS data structure. The first data may be considered, in certain embodiments, a shadow copy of the changes made to the OS data structure when the first application program is installed. The method may further include storing second data in the OS data structure for the changes in the OS data structure, the second data being stored in response to installing the first application program. In one embodiment, the first data may be stored in association with a copy of the first application program such that when the copy of the first application program is copied or moved, the first data is also automatically copied or moved with the first application program. In certain embodiments, the first data may be a checkpoint or a log for changes made in the OS data structure, which is an OS registry, as a result of installing the first application program, and the copy of the first application and the first data are associated as a package or bundle. The storing of the second data may occur on a first launch of the first application program. The first data and the second data are typically the same initially, and the first data specifies changes to the OS data structure made only in response to installing the first application program at least in certain embodiments. In certain embodiments, the method may further include storing, in response to installing a second application program, third data which specifies changes to the OS data structure as a result of installing the second application program, wherein the third data is stored separately from the OS data structure, and this method may further include storing fourth data in the OS data structure for the changes to the OS data structure as a result of installing the second application program. In at least certain embodiments, the storing of the first data and the third data and the storing of the second data and the fourth data are performed by a software component of a first operating system, and the first application program and the second application program are designed to operate on a second operating system which is different than the first operating system. Additional application programs, designed to operate on the second OS, may also be installed, and each can create changes to the OS data structure and also cause the storage of a separate copy of the changes. In at least certain embodiments, this software component is configured to allow the first application program and the second application program to execute without support from a copy of the second operating system. In at least certain embodiments, the first data is not modified after installing the first application program, and the second data is capable of being modified after installing the first application program. Similarly, the third data in at least certain embodiments is not modified after installing the second application program and the fourth data is capable of being modified after installing the second application program. In at least certain embodiments, the first data is a first shadow registry storing initial registry changes for only the first application program (caused by installing the first application program), and the third data is a second shadow registry storing initial registry changes for only the second application program (caused by installing the second application program), and the OS data structure is a system wide registry which is capable of being changed by a plurality of application programs, including the first application program and the second application program.

A data processing system in at least certain embodiments includes a processor, a bus coupled to the processor, and a memory coupled to the bus. The memory may be non-volatile and may store a first operating system which is configured to receive an installable program. The installable program is designed to operate on a second operating system which is different than the first operating system. The first operating system includes one or more software components which are configured to allow the installable program to execute on the data processing system without needing to have a copy of the second operating system present. The software component or components are configured to store first data which specifies changes to an operating system data structure of the second operating system made upon installing the installable program. The operating system data structure is used to configure a system to allow execution of the installable program after installation of the installable program. In at least certain embodiments, the first data is stored separately from the operating system data structure. The software component or components may be configured to store second data in the OS data structure in response to installing the installable program, and the second data represents the changes made to the OS data structure upon installing the installable program. In at least certain embodiments, the first data may be stored in association with a copy of the installable program such that when the copy of the installable program is copied or moved, the first data is also automatically copied or moved with the first application program. In at least certain embodiments, the first data is a checkpoint or a log for changes made to the OS data structure, which may be an OS registry of the second OS, and the copy of the installable program and the first data are associated as a package or bundle.

At least certain embodiments of the present invention include machine readable storage medium which store executable program instructions, including a first operating system and one or more software components configured to receive an installable program and to install the installable program to operate with the first operating system. The installable program is designed to operate with a second operating system which is different than the first operating system, and the software component is configured to store, in response to installation of the installable program, a first data specifying changes to an OS data structure of the second OS. The OS data structure is used to configure a system to execute the installable program after installation of the installable program. In at least certain embodiments, the first data is stored separately from the OS data structure. In at least certain embodiments, the software component may be configured to store, second data in the OS data structure in response to installing the installable program. Further, the first data, in at least certain embodiments, is not modified and the second data is configured to be capable of being modified; in this manner, the first data may be considered a checkpoint or a log for changes made, in response to installing the installable program, to the OS data structure, which may be an OS registry for the second OS. In at least certain embodiments, the software component may be configured to allow multiple applications, designed to work with the second OS and not the first OS, to make changes to the OS data structure. In at least certain embodiments, the software component may be written and designed for the first OS by using API (application program interface) calls to the first operating system but to also provide support for execution of the installable program on a system executing the first operating system which is not also executing the second operating system.

In another embodiment of the invention, the changes written to an OS data structure may be tagged or marked to identify that the changes were caused by installing an application. In this embodiment, data (e.g. the changes to a registry) which is written to the OS data structure may include a tag or identifier, associated with the installed application, which can be used to revert the OS data structure to its state prior to installing the application.

Other methods, data processing systems, and machine readable media are also described herein.

BRIEF DESCRIPTION OF THE DRAWINGS

The present invention is illustrated by way of example and not limitation in the figures of the accompanying drawings in which like references indicate similar elements.

FIGS. 5A, 5B, 5C, 5D, 5E and 5F show a memory or storage structure as it changes over time as multiple application programs are installed.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
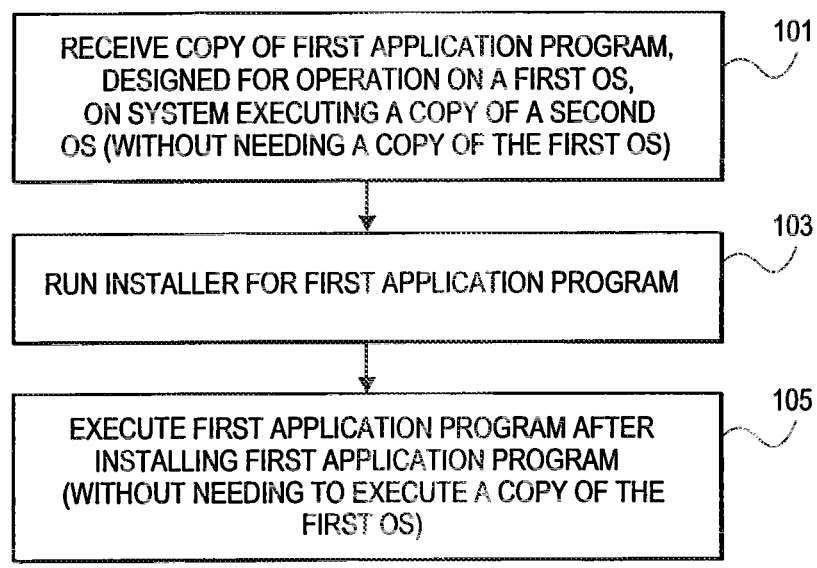
FIG. 1 is flowchart showing an overview of a method which may be used with at least certain embodiments of the present invention.

FIG. 1 is a flow chart which shows an overview of a method which may be used with at least certain embodiments of the present invention. This method allows an application written for a first operating system to be executed on a system which is executing a copy of a second operating system without requiring a copy of the first operating system to be present or to be executing. According to this method, an installer is used to create and/or store program files and other operating data structures for the first operating system for use by one or more programs installed by the installer. As is known in the art, programs written or designed for an operating system typically use APIs of the operating system which are different than APIs used in other operating systems. Referring now to FIG. 1, operation 101 involves receiving a copy of the first application program which is designed for operation on the first operating system. This copy is received on a system which is executing a copy of a second operating system which is different than the first operating system, and the system need not require a copy of the first operating system. In one embodiment, the first operating system may be a Windows OS or another OS and the second operating system may be the Macintosh OS. The first operating system may be referred to as an alternative operating system. The system which is executing the Macintosh OS need not require a copy of the first operating system which is a Windows operating system, such as Windows XP or Windows Vista. The system may be a data processing system, such as the system shown in FIG. 7, which may be a general purpose computer or a special purpose computer or a cellular telephone or other consumer electronic systems. In operation 103, an installer is run on the system in order to install the first application program. After it is installed, it is executed in operation 105 by the system, and the execution may be performed without needing to have a copy of the first operating system and without needing to execute a copy of the first operating system.

Figure 2:
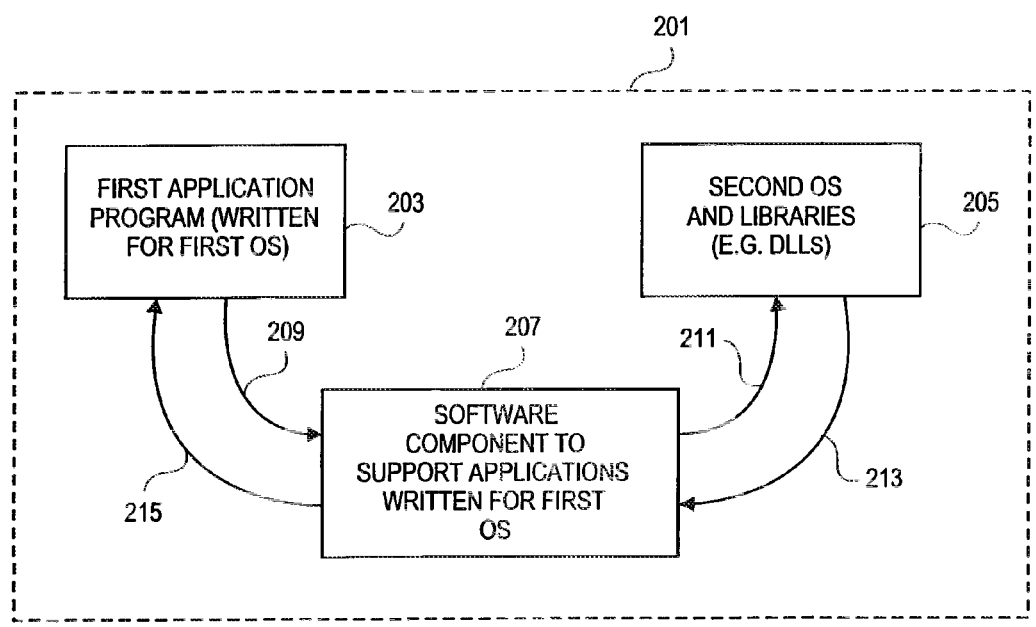
FIG. 2 is a diagram showing certain software elements and their interaction in a system according to at least certain embodiments of the present invention.

FIG. 2 is a diagram showing certain software elements and their interaction in a system according to at least certain embodiments of the present invention. Memory 201 may be one or more memory or storage devices which store the various software elements such as the first application program 203, the software component 207, and the second OS 205. The first application program 203 is written or designed for a first OS which is different than the second OS. An application program is typically written or designed for an OS by writing the application using APIs of the particular OS it is designed to run on. For example, in the case of an application written for the Windows OS, the application will use Windows APIs for calls to the Windows operating system or libraries used with Windows operating systems, such as dynamically linked libraries (DLL). These APIs and libraries are often different than APIs and libraries used by other operating systems, such as a UNIX operating system or a Macintosh operating system, such as Macintosh OS 10.5. The first application program 203 may be a user's program such as a word processing program, or an email program, etc. The software component 207 may be one or more components used to support both the installation and execution at runtime of the first application program on a system which is executing the second operating system and not the first operating system. The software component 207 may be one software module which both installs the first application program and supports its execution during runtime on the second operating system 205. In alternative embodiments, the software component 207 may merely support runtime execution of the first application program and a different software component performs installation of the first application program for execution with the second operating system 205. The software component 207, if it performs operations during installation, may perform the operations 305 and 307 of FIG. 3 or in other embodiments may perform operations 401, 403, 405, 407 and 409 of FIG. 4.

The software component 207 is typically written for and designed for operation with the second operating system in that it uses APIs and/or calls to the second operating system and not the first operating system. It is also, however, written to provide a transformation interface between APIs for the first operating system and APIs for the second operating system and also to interface between the first application program 203 and libraries, such as DLLs which are used by the first application program. FIG. 2 shows an example of the interfacing between the first application program and the second OS 205 that is performed by the software component 207. In one embodiment, operation 209 may be a call from the first application program 203 to the first operating system or a DLL of the first operating system. This call is received by the software component 207 and transformed into a call 211 for the second operating system. The transformation may involve modifying the format or other parameters of the call in order to comply with the requirements of the second operating system 205. The second operating system 205 responds with a returned value or other response 213 which is, in turn, returned in operation 215 by the software component 207 which may again transform the values or information in the response before providing it to the first application program 203.

Figure 3:
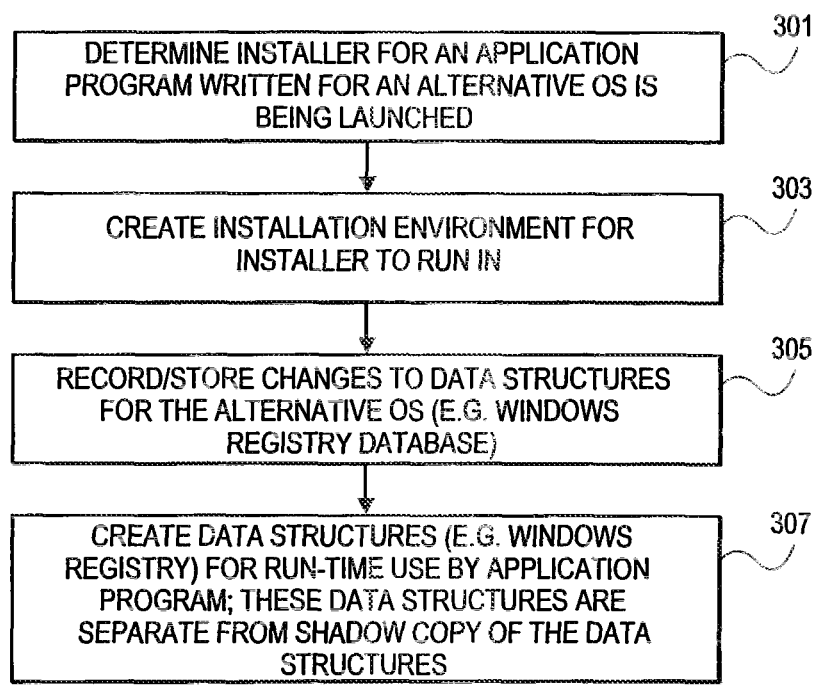
FIG. 3 is a flowchart showing a method according to at least certain embodiments of the present invention.

FIG. 3 is a flowchart showing a method according to at least certain embodiments of the present invention. In this method, an application program written for an alternative operating system and a shadow copy of data structures for that program may not be bundled or packaged together. In other words, the method of FIG. 3 does not require the creation of a bundle or package which includes both an installable version of the application program written for an alternative operating system and a shadow copy of data structures, such as a registry data structure in a single bundle or package. In operation 301, it is determined whether an installer for the application program written for the alternative operating system is being launched. This may be performed by a software component 207 as in FIG. 2 or by a daemon which executes separately from the software component 207. In an embodiment in which a daemon is used, the second operating system may launch the daemon at startup, and the software component 207 may not be launched until required when an installer is determined to have been launched as in operation 301. In operation 303, the system, in response to determining in operation 301 that an installer has been launched, creates an installation environment for the installer to run in; this installation environment may be created by the software component 207 or by another software component which performs installation functions but not runtime support functions. The software installation process involves receipt of calls from an installer by a software component, such as software component 207, and this software component may return responses to those calls, and this may be done without writing data structures to a final runtime data structure, such as a final runtime registry database. This installation environment may be referred to as a virtual installation environment, which is used to record or store changes to data structures as in operation 305. These data structures may include a registry database or a file system structure. In one embodiment, the data structure may be the Windows registry database, and the changes stored in operation 305 may be those changes to the Windows registry database which are made in response to installing the application program, and only that application program. These changes which are stored in operation 305 may be reflected or indicated by a log which shows entries which were added to the registry database and entries which were deleted from that database. After operation 305, operation 307 creates the data structures used at runtime by the application programs. In at least certain embodiments, these data structures, which are used for runtime support of the application program written for the alternative operating system, are separate from a shadow copy of the data structures created in operation 305.

Figure 4:
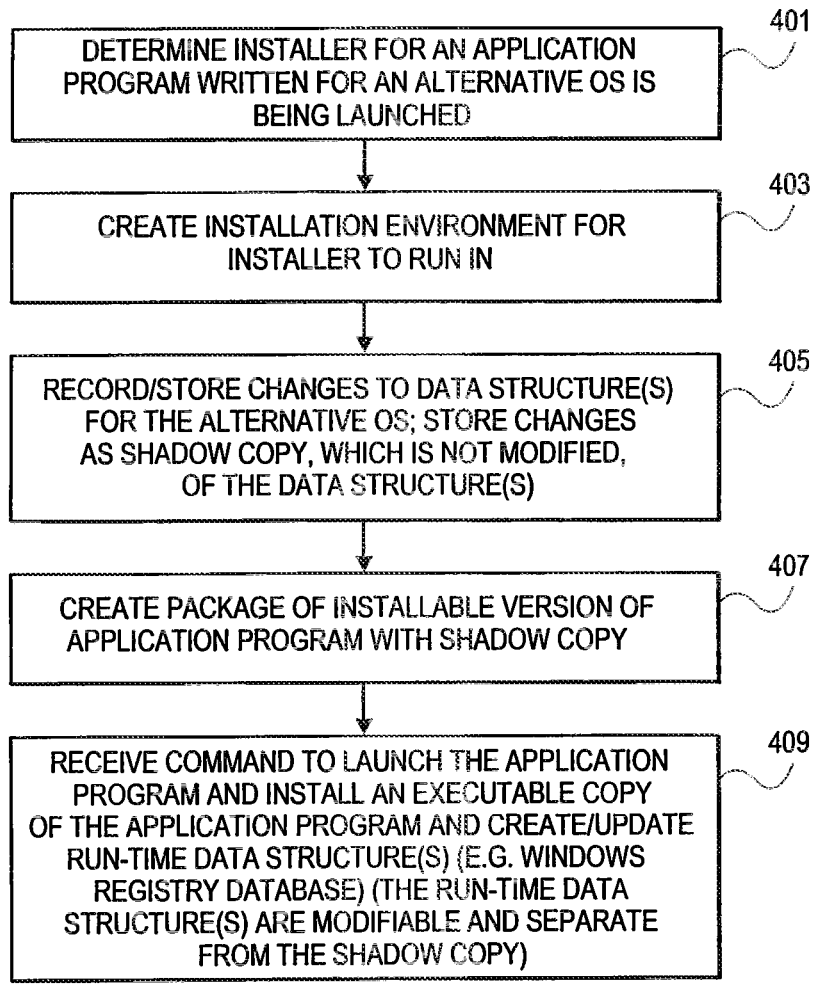
FIG. 4 is a flowchart showing another method according to at least certain embodiments of the present invention.

FIG. 4 is a flowchart showing another example of a method according to at least certain embodiments of the present invention. In this method, a package or bundle is created which includes both the installable version of an application program written for the alternative operating system along with a shadow copy of data structures used to support the application program, such as the Windows registry data structure. The memory structures shown in FIGS. 5A, 5B, 5C, 5D, 5E and 5F show the state of programs and data structures over time as one or more application programs written for an alternative operating system are installed according to the method of FIG. 4. In operation 401, it is determined whether or not an installer for an application program written for the alternative operating system is being launched. This operation 401 is similar to operation 301 described above. If it is determined that an installer is being launched in operation 401, then an installation environment is created in operation 403 for the installer to run in. This operation 403 is similar to the operation 303 described above. The installation environment may be referred to as a virtual installation environment. While the virtual installation environment exists, operation 405 creates a shadow copy of changes to data structures for the alternative operating system, such as the Windows registry data structure. In other words, operation 405 stores changes to this data structure as a shadow copy, which is not to be modified. The shadow copy may be in the form of a log which shows, for each application, entries which were added to the registry when the application was installed and entries which were deleted from the registry when the application was installed. Then in operation 407, a package or bundle of the installable version of the application program is created along with the shadow copy and this is saved on the system for later use when the application is to be installed. In one embodiment, operation 407 may be done as part of 409 and may occur together in time such that the package is created and then the application is installed. In alternative embodiments, the package may be created but no executable copy of the application program is installed until receiving a command to launch the application program. In operation 409, the system receives a command to launch the application and installs, in response to that command, an executable copy of the application program using the package to create this executable copy. Further, the system creates or updates the runtime data structure for the alternative operating system, such as the Windows registry database. These runtime data structures are modifiable and are kept separate from the shadow copy. Keeping the shadow copy separate from the runtime data structures allows a user to reinstall or reinitialize these data structures from the package. For example, if the Windows registry becomes corrupted or otherwise is unusable, it may be reinitialized by reinstalling, from the package, both the executable copy of the application program and the runtime data structures maintained for the alternative operating system, such as the Windows registry. Furthermore, the bundling of the shadow copy of the data structures with the installable version of the application program allows a user to move or copy the package for the application program to a new system. An example of this is shown in FIG. 6 in which a user may move or copy the package in operation 601 to a new system and then install, in operation 603, the application program from the package and also update the registry from the package.

FIGS. 5A, 5B, 5C, 5D, 5E and 5F show a memory or storage structure as it changes over time as multiple application programs are installed according to at least one embodiment of the present invention, such as the embodiment shown in FIG. 4. Each of the memory structures 501A, 501B, 501C, 501D, 501E and 501F represent one or more storage or memory devices which store application programs and data structures. For example, each of these memory structures, such as the memory structure 501A, may include an optical disk (e.g. a CD or DVD disk), DRAM and a hard drive or other mass storage device or network storage, which together provide the memory structure for storing the various programs and data structures. The programs and data structures may be stored locally on a data processing system or in a distributed manner on both the local storage device and a remote storage device which is accessed through a network or other connection.

Figure 5A:
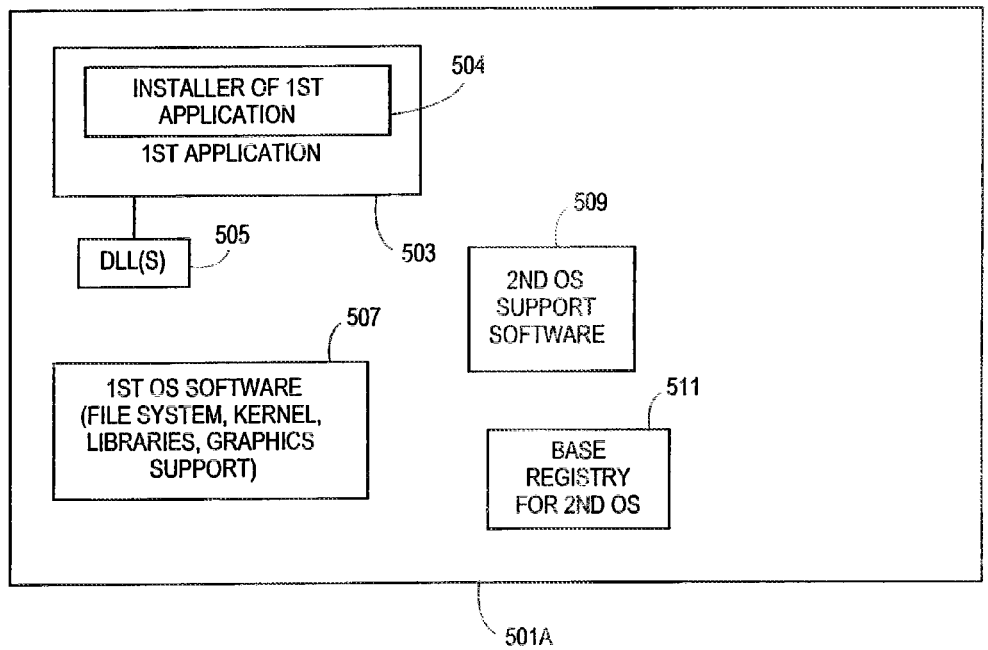
Figure 5B:
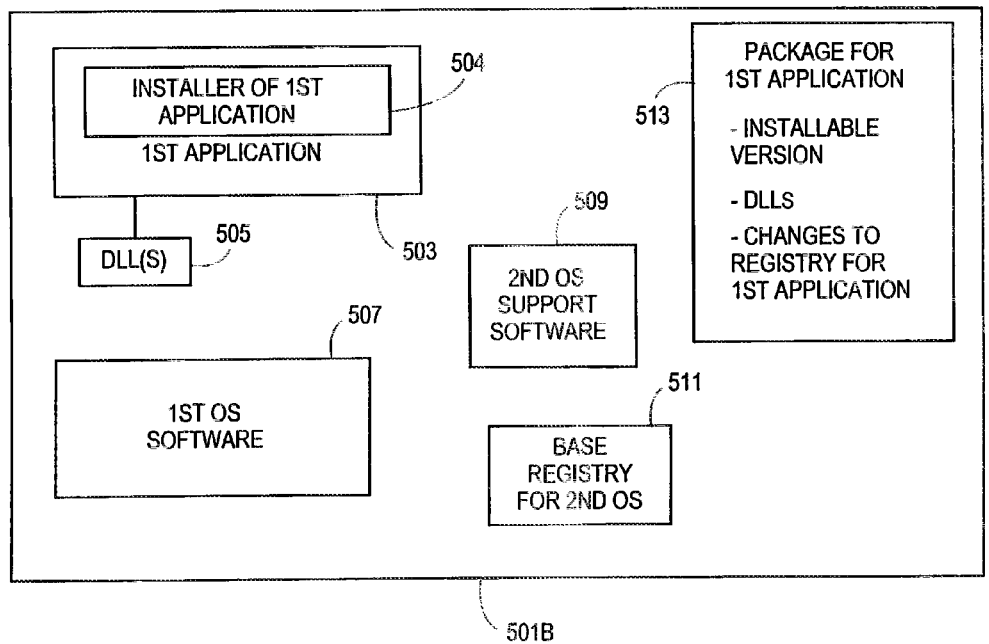

The memory structure 501A shown in FIG. 5A includes a first OS software 507 which may include executable software for a file system for the first operating system as well as a kernel for the first operating system and libraries for the first operating system which may include graphics support. The first operating system may also provide another software component which is the second operating system support software 509 which may be the same as or similar to the software component 207 of FIG. 2. The second OS support software 509 may, in at least certain embodiments, perform the functions of operations 403, 405, 407, and 409 of FIG. 4 and may also perform the functions of operation 401 or a daemon may perform the functions of operation 401 and call the support software 509 when the daemon has determined that an installer for an application program written for the second operating system has been launched. The first operating system software 507 or the second operating system support software 509 may create a base registry 511 for the second operating system. This base registry may have the standard format and content of a base registry for the second operating system, such as a Windows registry which exists before any user applications are installed on a system. The first application program 503 includes an installer 504 which is used to install the first application onto a system. The first application program 503 may also come with copies of one or more DLLs 505 which are libraries used during execution of the first application program as is known in the art. A user may obtain the first application program by loading a CD or DVD containing the application program or may download the application program from a server or other source through a connection to the server or source. The user installs the first application by causing the installer 504 to be executed. This will, in turn, be detected in operation 401 which will cause the creation of an installation environment in operation 403. In the example shown in FIGS. 5A-5F, the second OS support software 509 creates the installation environment and records or stores the changes to data structures for the second operating system in order to create the package 513 shown in FIG. 5B. This package 513 includes an installable version, for the first operating system, of the first application written and designed for the second operating system. The DLLs may be included with each package so that a package is complete and portable from machine to machine. The changes to the registry written into the package 513 constitute a shadow copy of changes made to the base registry or other registry as a result of the installation, in the virtual installation environment, of the first application program 503. In one embodiment, these changes to the registry are the changes created upon installing only the first application rather than other applications. At the point shown in FIG. 5B, no changes have been made to the base registry 511. The contents of the package 513 can be moved from one machine to another machine or can be used to reinstall the first application, including to reinitialize the registry to be compatible with the first application after a reinstallation. Operation 407 shown in FIG. 4 results in the creation of the package 513 in at least certain embodiments of the present invention. After the package has been created, the user may decide to actually launch the first application, which causes the installation of an executable copy, as in operation 409. This executable copy is created from the package 513 to create the installed first application 515 which includes the DLLs as shown in FIG. 5C. After installation, the package 513 remains as it was in FIG. 5B. In certain embodiments, the installed first application 515 may be created when the package 513 is created rather than when the first application is first launched.

Figure 5D:
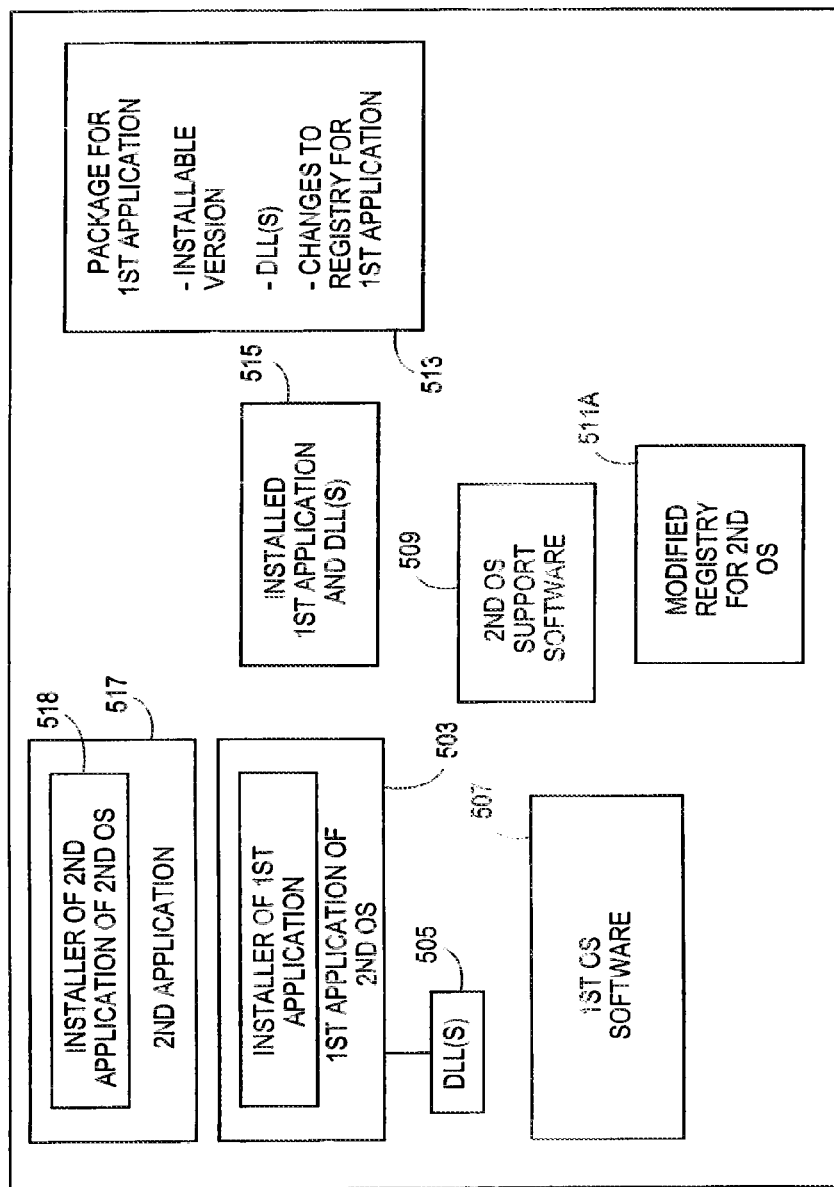
Figure 5E:
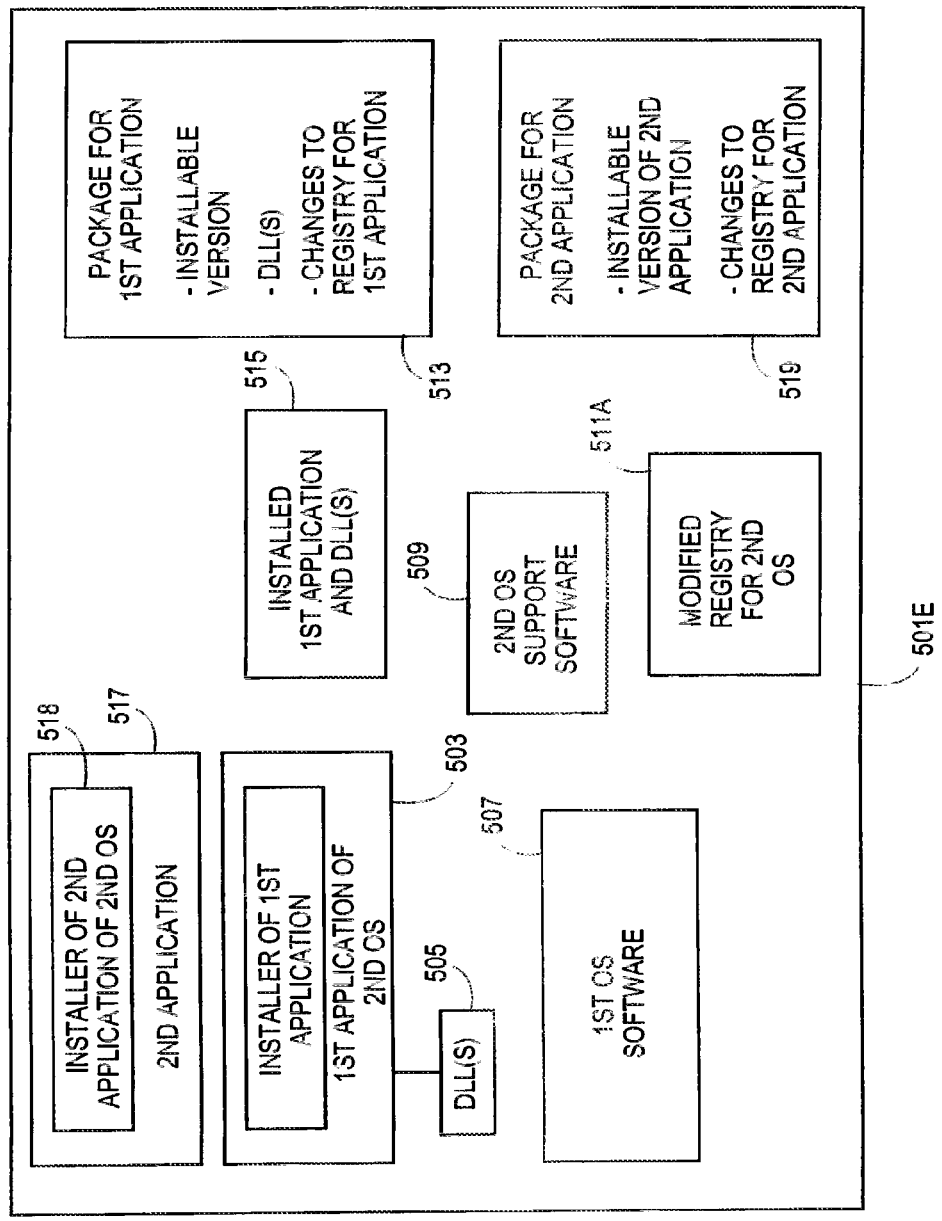
Figure 5F:
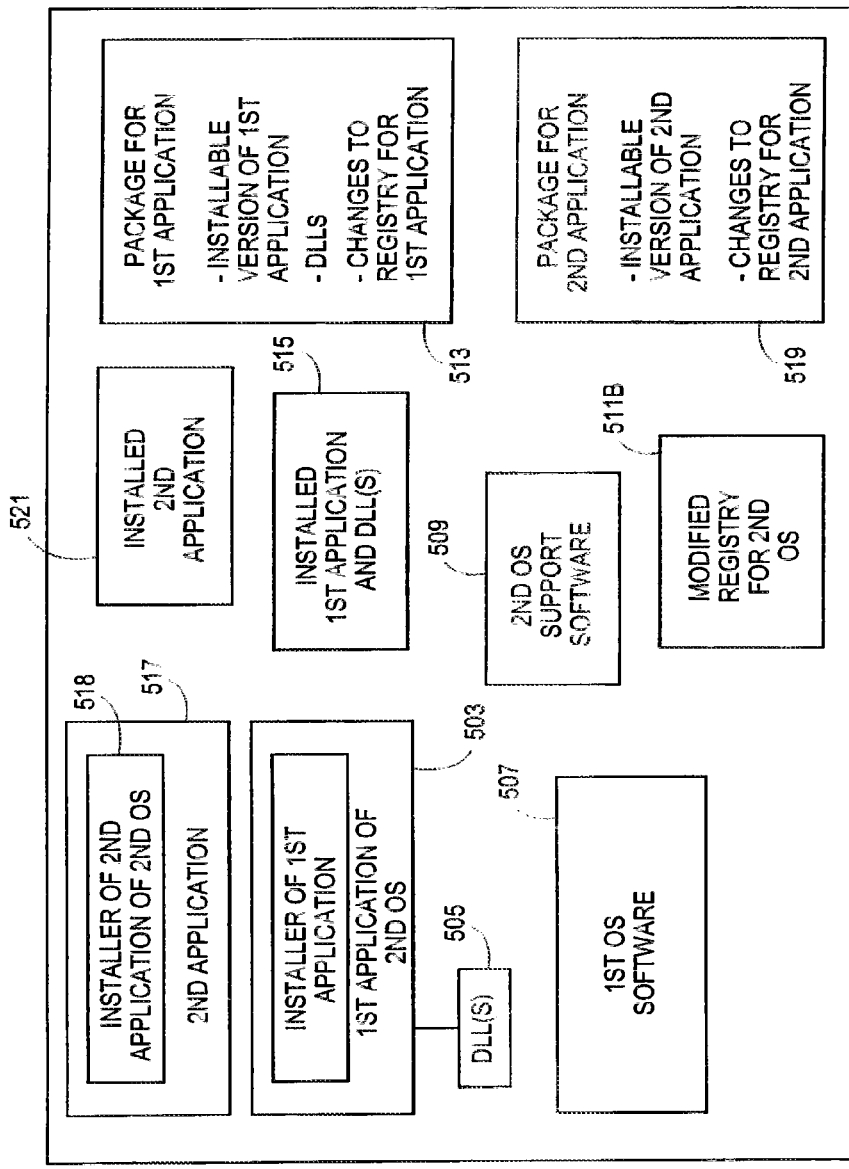
Figure 6:
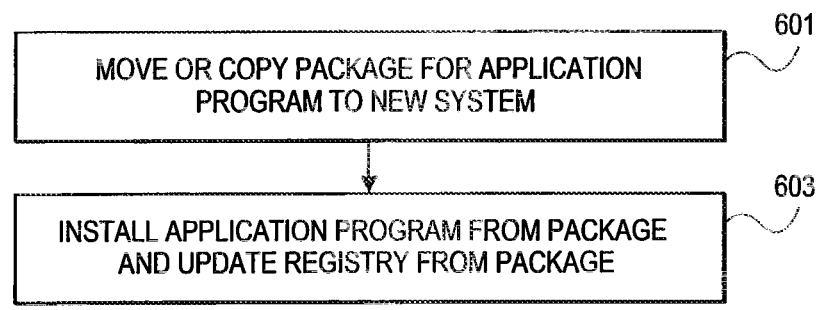
FIG. 6 is a flowchart showing another method according to at least certain embodiments of the present invention.

The memory structures shown in FIGS. 5D, 5E and 5F show how the state of these structures change as a second application program is installed in the system. The second application 517 is loaded onto the system, and this application includes an installer 518 which, when executed, causes the creation of the package 519 shown in FIG. 5E. This package 519 includes an installable version of the second application which is designed to operate in conjunction with the second OS support software 509 and the first operating software 507 without having a copy of the second operating system present on the system. The package 519 also includes a shadow copy of the changes to the registry for the second application. These changes have not yet been written to the modified registry 511A shown in FIG. 5B. The second application can be installed concurrently with the creation of the package 519 or, as in the embodiment shown in FIG. 4, upon first launch of the second application, which causes the creation of the installed second application 521 shown in FIG. 5F. At this time, when the second application is installed, the registry is modified for a second time, creating the modified registry 511B. The modified registry 511B includes changes made as a result of installing the first application and also changes made as a result of installing the second application. The modified registry 511A includes only changes made to the registry as a result of installing the first application (assuming the first application was, in fact, the first application for the alternative operating system which in this case is the second operating system).

At least certain aspects of the present invention give the user flexibility in being able to reinstall an application program for the alternative operating system or to move the application program from one machine to a new machine. FIG. 6 represents a method which shows how a user can move or copy the package, which includes both the installable version and a copy of changes to the registry or other OS data structure. Storing the installable version together with a copy of the changes in a bundle or package allows a user to use the package to both reinstall the application, on the same or a new machine, and to change the registry. Further, the package format assures that when the application is moved to a new machine, the changes for the registry for that application will move with the application; for example, if the user uses a file system program, such as the Finder from Apple Inc., to create a copy of the application on a new machine (and to delete the original application) the changes move with the application. Moreover, if the user needs to reset the registry to a default state (which exists before any applications are installed), the registry can be updated by reinstalling the application from the package without having to perform operations in a virtual installation environment as described above; this reinstalling from the package will update the registry which was reset.

In at least certain embodiments, the shadow copy of changes to the Windows registry created for an application program contains only those changes made to the registry when that application program was installed. In alternative embodiments, a global and accumulative shadow copy may be created which includes all changes made as a result of installing the current set of application programs.

In another embodiment of the invention, the changes written to an OS data structure, such as a registry, may be tagged to identify that the changes were caused by installing an application. In this embodiment, data (e.g. the changes to a registry) which is written to the OS data structure may include a tag or identifier, associated with the installed application, which can be used to revert the OS data structure to its state prior to installing the application. In this embodiment, a shadow copy of the changes is optional and need not be stored in association with the application. Such a tag or identifier may be used to remove the changes to the OS data structure; entries which were added to the OS data structure can be deleted by searching for and deleting entries tagged with such a tag, and entries which were deleted can be recovered by searching for and adding back those entries which were tagged and also marked as deleted. This embodiment allows a system to rollback the OS data structure to various different states which existed as a sequence of application programs were installed (e.g. if the sequence is recorded, the OS data structure can be reverted to any state in the sequence). This embodiment also allows a system to selectively remove the effect of the installation of a particular application program even if several other application programs have been installed after the installation of the particular application program; this selective removal can be performed by searching for the tag for the particular application program and using that tag to remove added entries marked by that tag and to recover/add back entries which were deleted and marked by that tag.

Figure 7:
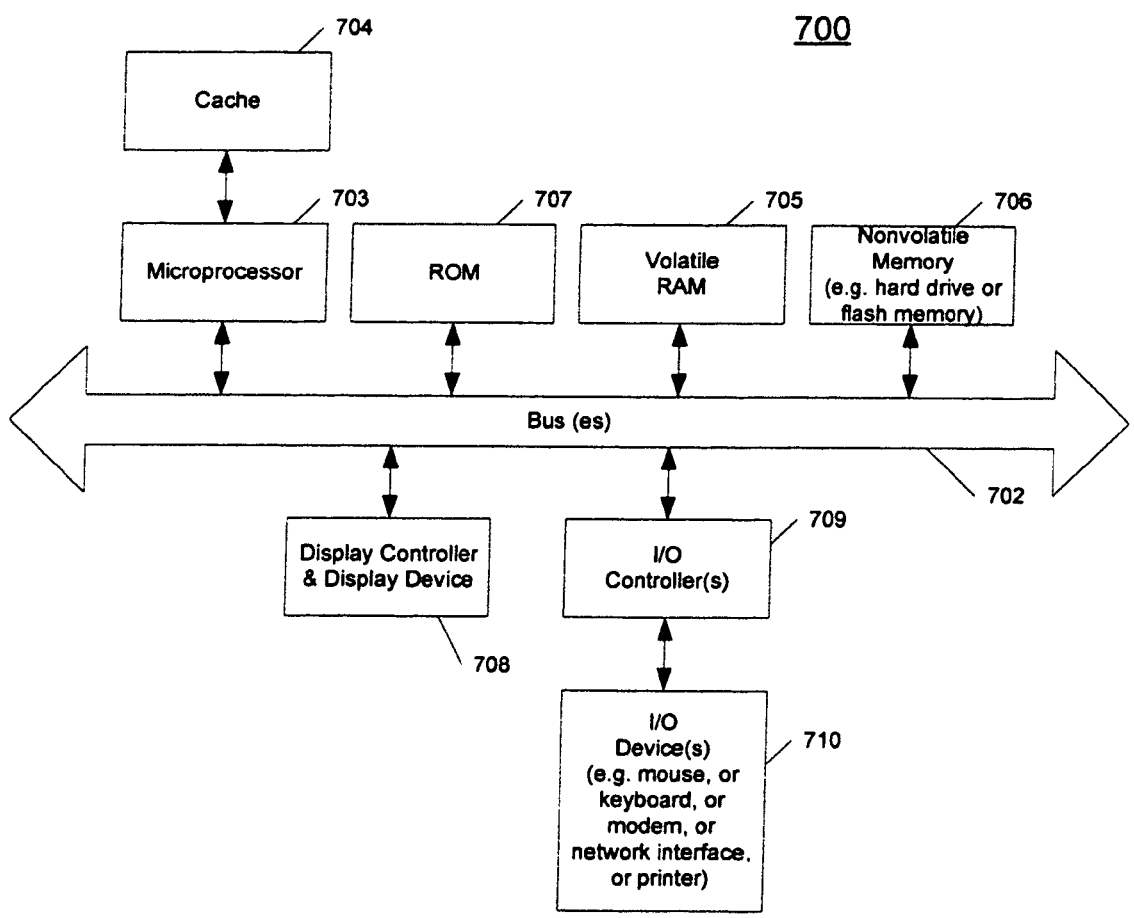
FIG. 7 is an example of a data processing system which may be used with at least certain embodiments of the present invention.

FIG. 7 shows one example of a data processing system, such as a computer system or other consumer electronic system, which may be used with one embodiment of the present invention. For example, the system 700 may be implemented as a part of the system shown in FIG. 2. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. These other data processing systems may be handheld computers, cellular telephones, entertainment systems and other consumer electronic devices or systems.

As shown in FIG. 7, the computer system 700, which is a form of a data processing system, includes a bus 702 which is coupled to a microprocessor(s) 703 and a ROM (read only memory) 707 and volatile RAM 705 and a non-volatile memory 706. The microprocessor 703 may retrieve the instructions from one or more of the memories 705, 706 and 707 and execute the instructions to perform operations described above. The bus 702 interconnects these various components together and also interconnects these components to a display controller and display device 708 and to peripheral devices 710 such as input/output (I/O) devices which may be mice, keyboards, modems, network interfaces, printers and other devices which are well known in the art. Typically, the input/output devices 710 are coupled to the system through input/output controllers 709. The volatile RAM (random access memory) 705 is typically implemented as dynamic RAM (DRAM) which requires power continually in order to refresh or maintain the data in the memory.

The non-volatile memory 706 may be mass storage which is typically a magnetic hard drive or a magnetic optical drive or an optical drive or a DVD RAM or a flash memory or other types of memory systems which maintain data (e.g. large amounts of data) even after power is removed from the system. Typically, the mass storage will also be a random access memory, although this is not required. While FIG. 7 shows that the mass storage is a local device coupled directly to the rest of the components in the data processing system, it will be appreciated that the present invention may utilize a non-volatile memory which is remote from the system, such as a network storage device which is coupled to the data processing system through a network interface, such as a modem or Ethernet interface or wireless networking interface. The bus 702 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g., a Java Virtual Machine), an interpreter, a Common Language Runtime, a high-level language virtual machine, etc.) and/or electronic circuitry disposed on a semiconductor chip (e.g. "logic circuitry" implemented with transistors) designed to execute instructions such as a general purpose processor and/or a special purpose processor. Processes taught by the discussion above may also be performed by (in alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine readable media suitable for storing electronic instructions. Program code may also be downloaded from a remote computer (e.g. a server) to a requesting computer (e.g. a client) by way of data signals embodied in a propagation medium (e.g. via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general purpose computer selectively activated or reconfigured by a computer program stored in the computer. Such a computer program may be stored in a computer readable storage medium such as, but not limited to, any type of disk including floppy disks, optical disks, CD-ROMs and magnetic optical disks, read-only memories (ROMs), RAMs, EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by a system, comprising:
  receiving information indicating that an installer is being launched for a first application program, wherein the system is executing a first operating system (OS) and the first application program is designed to operate on a second operating system that does not execute on the system;
  generating a virtualized installation environment, wherein the virtualized installation environment is configured to carry out the installation of the first application program by carrying out steps that include:
    generating an OS data structure utilized by the first application program, wherein the OS data structure is designed for the second operating system and is a system registry that is capable of being changed by a plurality of application programs,
    establishing first data that specifies changes made to the OS data structure by way of a virtualized installation of the first application program, wherein the first data is a first shadow registry storing initial registry changes for only the first application program, and
    creating a package that includes an installable version of the first application program, the first data, and dynamically linked libraries (DLL) associated with the first application program; and
  using the package, installing the first application program onto the system, wherein installing the first application program comprises:
    storing second data that specifies changes to the OS data structure made when installing the first application program, wherein the second data is modifiable by the first application program when executed but the first data is not modifiable by the first application program when executed.

2. The method as in claim 1, wherein the first data is stored in association with a copy of the first application program such that when the copy of the first application program is copied or moved, the first data is also automatically copied or moved with the first application program.

3. The method as in claim 2, wherein the first data is a log for the changes made to the OS data structure, and the copy of the first application program and the first data are associated as a bundle.

4. The method as in claim 1, wherein the first data and the second data are initially the same.

5. The method as in claim 1, further comprising:
storing, in response to installing a second application program, third data that specifies changes to the OS data structure as a result of installing the second application program, the third data being stored separately from the OS data structure; and
storing fourth data in the OS data structure for the changes to the OS data structure as a result of installing the second application program, wherein the storing of the first data and the third data and the storing of the second data and the fourth data are performed by a software component of the first OS, the second application program is designed to operate on the second operating system, and the software component is configured to allow the first application program and the second application program to execute without executing the second operating system.

6. The method as in claim 5, wherein the fourth data is modifiable by the second application program when executed but the third data is not modifiable by the second application program when executed.

7. The method as in claim 6, wherein the third data is a second shadow registry storing initial registry changes for only the second application program.

8. A non-transitory machine readable storage medium storing executable program instructions that, when executed by a processor included in a system, cause the system to carry out steps that comprise:
receiving information indicating that an installer is being launched for a first application program, wherein the system is executing a first operating system (OS) and the first application program is designed to operate on a second operating system that does not execute on the system;
generating a virtualized installation environment, wherein the virtualized installation environment is configured to carry out the installation of the first application program by carrying out steps that include:
generating an OS data structure utilized by the first application program, wherein the OS data structure is designed for the second operating system and is a system registry that is capable of being changed by a plurality of application programs,
establishing first data that specifies changes made to the OS data structure by way of a virtualized installation of the first application program, wherein the first data is a first shadow registry storing initial registry changes for only the first application program, and
creating a package that includes an installable version of the first application program, the first data, and dynamically linked libraries (DLL) associated with the first application program; and
using the package, installing the first application program onto the system, wherein installing the first application program comprises:
storing second data that specifies changes to the OS data structure made when installing the first application program, wherein the second data is modifiable by the first application program when executed but the first data is not modifiable by the first application program when executed.

9. The non-transitory machine readable storage medium as in claim 8, wherein the first data is stored in association with a copy of the first application program such that when the copy of the first application program is copied or moved, the first data is also automatically copied or moved with the first application program.

10. The non-transitory machine readable storage medium as in claim 9, wherein the first data is a log for the changes made to the OS data structure, and the copy of the first application program and the first data are associated as a bundle.

11. The non-transitory machine readable storage medium as in claim 8, wherein the first data and the second data are initially the same, and wherein the first data specifies changes only for the first application program.

12. The non-transitory machine readable storage medium as in claim 8, wherein the steps further comprise:
storing, in response to installing a second application program, third data that specifies changes to the OS data structure as a result of installing the second application program, the third data being stored separately from the OS data structure; and
storing fourth data in the OS data structure for the changes to the OS data structure as a result of installing the second application program, wherein the storing of the first data and the third data and the storing of the second data and the fourth data are performed by a software component of a first operating system, and the second application program is designed to operate on the second operating system, and the software component is configured to allow the first application program and the second application program to execute without executing the second operating system.

13. The non-transitory machine readable storage medium as in claim 12, wherein the fourth data is modifiable by the second application program when executed but the third data is not modifiable by the second application program when executed.

14. The non-transitory machine readable storage medium as in claim 13, wherein the third data is a second shadow registry storing initial registry changes for only the second application program.

15. A data processing system, comprising:
means for receiving information indicating that an installer is being launched for a first application program, wherein the data processing system is executing a first operating system (OS) and the first application program is designed to operate on a second operating system that does not execute on the data processing system;
means for generating a virtualized installation environment, wherein the virtualized installation environment is configured to carry out the installation of the first application program by carrying out steps that include:
generating an OS data structure utilized by the first application program, wherein the OS data structure is designed for the second operating system and is a system registry that is capable of being changed by a plurality of application programs,
establishing first data that specifies changes made to the OS data structure by way of a virtualized installation of the first application program, wherein the first data is a first shadow registry storing initial registry changes for only the first application program, and creating a package that includes an installable version of the first application program, the first data, and dynamically linked libraries (DLL) associated with the first application program; and means for using the package, installing the first application program onto the data processing system, wherein installing the first application program comprises:

storing second data that specifies changes to the OS data structure made when installing the first application program, wherein the second data is modifiable by the first application program when executed but the first data is not modifiable by the first application program when executed.

16. The data processing system as in claim 15, wherein the first data is stored in association with a copy of the first application program such that when the copy of the first application program is copied or moved, the first data is also automatically copied or moved with the first application program.

17. The data processing system as in claim 16, wherein the first data is a log for the changes made to the OS data structure, and the copy of the first application program and the first data are associated as a bundle.

18. The data processing system as in claim 15, wherein the first data and the second data are initially the same.

19. A system, comprising:

a processor; and a memory, wherein the memory stores instructions that, when executed by the processor, cause the system to:

receive information indicating that an installer is being launched for a first application program, wherein the system is executing a first operating system (OS) and the first application program is designed to operate on a second operating system that does not execute on the system;

generate a virtualized installation environment, wherein the virtualized installation environment is configured to carry out the installation of the first application program by carrying out steps that include:

generating an OS data structure utilized by the first application program, wherein the OS data structure is designed for the second operating system and is a system registry that is capable of being changed by a plurality of application programs, establishing first data that specifies changes made to the OS data structure by way of a virtualized installation of the first application program, wherein the first data is a first shadow registering storing initial registry changes for only the first application program, and creating a package that includes an installable version of the first application program, the first data, and dynamically linked libraries (DLL) associated with the first application program; and using the package, install the first application program onto the system, wherein installing the first application program comprises:

storing second data that specifies changes to the OS data structure made when installing the first application program, wherein the second data is modifiable by the first application program when executed but the first data is not modifiable by the first application program when executed.

20. The system as in claim 19, wherein the first data is stored in association with a copy of the first application program such that when the copy of the first application program is copied or moved, the first data is also automatically copied or moved with the first application program.

21. The system as in claim 20, wherein the first data is a log for the changes made to the OS data structure, and the copy of the first application program and the first data are associated as a bundle.

22. The system as in claim 19, wherein the first data and the second data are initially the same.

23. The system as in claim 19, wherein the memory further stores instructions that, when executed by the processor, cause the system to:

store, in response to installing a second application program, third data that specifies changes to the OS data structure as a result of installing the second application program, the third data being stored separately from the OS data structure; and store fourth data in the OS data structure for the changes to the OS data structure as a result of installing the second application program, wherein the storing of the first data and the third data and the storing of the second data and the fourth data are performed by a software component of the first OS, the second application program is designed to operate on the second operating system, and the software component is configured to allow the first application program and the second application program to execute without executing the second operating system.

24. The system as in claim 23, wherein the fourth data is modifiable by the second application program when executed but the third data is not modifiable by the second application program when executed.

25. The system as in claim 24, wherein the third data is a second shadow registry storing initial registry changes for only the second application program.

* * * * *

UNITED STATES PATENT AND TRADEMARK OFFICE
CERTIFICATE OF CORRECTION

| | | |
|---|---|---|
| PATENT NO. | : 8,745,601 B1 | |
| APPLICATION NO. | : 12/175435 | |
| DATED | : June 3, 2014 | |
| INVENTOR(S) | : Eric O. Carlson et al. | |

It is certified that error appears in the above-identified patent and that said Letters Patent is hereby corrected as shown below:

In the Claims

Col. 15, Claim 19, line 50: "first shadow registering" should read --first shadow registry--.

Signed and Sealed this
Nineteenth Day of August, 2014

Michelle K. Lee
*Deputy Director of the United States Patent and Trademark Office*